(12) United States Patent
Klint

(10) Patent No.: US 7,057,911 B2
(45) Date of Patent: Jun. 6, 2006

(54) MEMORY STRUCTURE, A SYSTEM, AND AN ELECTRONIC DEVICE, AS WELL AS A METHOD IN CONNECTION WITH A MEMORY CIRCUIT

(75) Inventor: Jani Klint, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/659,067

(22) Filed: Sep. 10, 2003

(65) Prior Publication Data
US 2004/0136259 A1   Jul. 15, 2004

(30) Foreign Application Priority Data
Sep. 10, 2002   (FI)   .................................. 20021620

(51) Int. Cl.
*G11C 15/00*   (2006.01)
(52) U.S. Cl. .................. 365/49; 365/230.03; 711/117; 711/118; 711/131; 711/149
(58) Field of Classification Search ............. 365/49 O, 365/230.03 X; 711/117 X, 118 X, 131, 149 X
See application file for complete search history.

(56) References Cited
U.S. PATENT DOCUMENTS
5,056,010 A * 10/1991 Huang ........................... 711/4

| | | | |
|---|---|---|---|
| 6,335,565 B1 | 1/2002 | Miyamoto et al. | |
| 2002/0015349 A1 | 2/2002 | Matsui | |
| 2002/0120820 A1 | 8/2002 | Higuchi et al. | |
| 2002/0185337 A1 * | 12/2002 | Miura et al. .................. | 185/11 |
| 2003/0182517 A1 * | 9/2003 | Gooch ........................ | 711/150 |

FOREIGN PATENT DOCUMENTS
EP   1 150 302   10/2001

* cited by examiner

*Primary Examiner*—VanThu Nguyen

(57) ABSTRACT

A memory circuit (1) comprises at least a non-volatile random access memory (3) and a random access memory (4). The memory circuit (1) also comprises a memory controller (5) connected by a first bus (6) to the non-volatile random access memory (3) and by a second bus (10) to the random access memory (4). Thus, data can be transmitted between non-volatile random access memory (3) and random access memory (4) via the memory controller (5). The memory circuit comprises a control bus (12) connected to the memory controller (5) to control operation of the memory circuit (1). The invention also relates to a corresponding system and corresponding electronic device (2) in which the memory circuit (1) is used. The invention also relates to a corresponding method in connection with a memory circuit, in which at least a non-volatile random access memory (3) and a random access memory (4) are used.

18 Claims, 5 Drawing Sheets

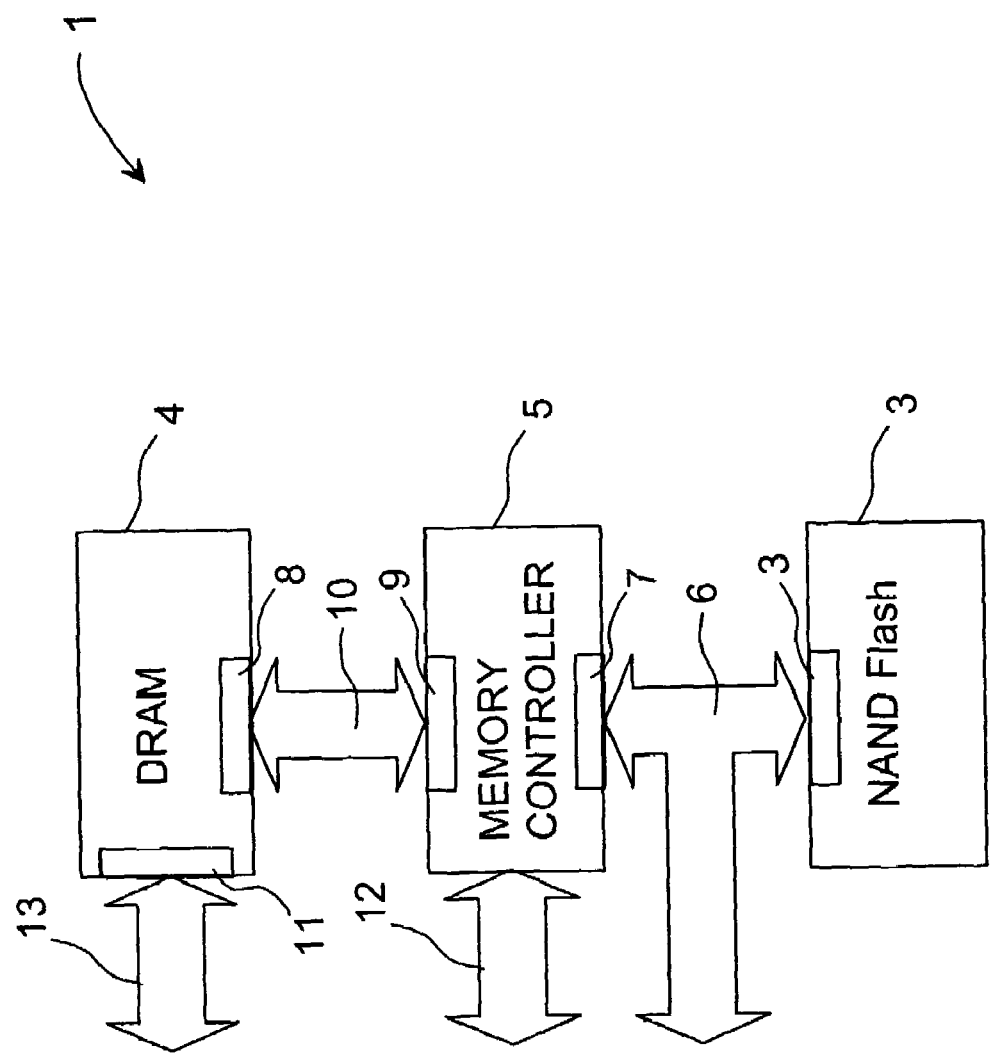

MEMORY STRUCTURE, A SYSTEM, AND AN ELECTRONIC DEVICE, AS WELL AS A METHOD IN CONNECTION WITH A MEMORY CIRCUIT

CROSS-REFERENCE TO RELATED APPLICATIONS

This application claims priority under 35 USC §119 to Finnish Patent Application No. 20021620 filed on Sep. 10, 2002.

1. Field of the Invention

The present invention relates to a memory structure comprising at least a non-volatile random access memory and a random access memory. The invention also relates to a system comprising at least a non-volatile random access memory and a random access memory. Furthermore, the invention relates to an electronic device comprising at least a non-volatile random access memory and a random access memory. The invention also relates to a method in connection with a memory circuit, in which method at least a non-volatile random access memory and a random access memory are used.

2. Background of the Invention

A Flash memory is an electrically erasable programmable read only memory (EEPROM). Thus, data written in the memory will remain in the storage even though no operating voltage were coupled to the memory. A NAND Flash memory is a memory implemented with corresponding technology, in which, to reduce the number of external connection lines, the same connection lines are used for different purposes, such as to give commands to the memory, to transmit an address and to transfer information into and from the memory. Such an arrangement requires the implementation of control logics to take care that the correct signals are coupled to the memory at the correct time. FIG. 1 shows an example of the connection lines of such a NAND Flash memory 3. I/O lines are used for the transmission of said commands and addresses to the memory as well as for data transmission. A command latch enable line CLE is used to inform the memory when a command is set on the I/O line to execute a memory operation. An address latch enable line ALE is used, correspondingly, to inform when address data has been set in the I/O lines. A chip enable line CE is used to activate the circuit. By means of this line, the memory circuit can be set in an active or a standby state. A read enable line RE is used to control the reading of data from the memory, and, correspondingly, a write enable line WE is used to control the writing of data in the memory. The memory can be protected, for example, from inadvertent writing, by means of a write protect line WP. A ready/busy line RY/BY is used to indicate whether an operation is still under processing in the memory or whether the memory is ready to receive the next command. It is necessary to read this ready/busy line particularly when writing in the memory, because writing in the NAND Flash memory typically takes considerably longer than reading from the memory. The memory may still comprise other connection lines, such as a spare area enable line SE, by which one or more spare areas possibly available in the memory can be taken into use.

However, the use of a flash memory as a conventional data storage is limited, for example due to the fact that a single byte cannot be read directly from or written in the memory, but at each reading time, several bytes, for example 32 bytes, are read from the memory. In a corresponding manner, when writing in the flash memory, several bytes are written, wherein special measures will be needed to change the content of a single byte when compared with a conventional random access memory. Furthermore, in the flash memory, the number of write operations is limited to even less than 100,000 write operations per memory cell. For this reason, flash memories are used for the storage of such data which are not changed all the time. One use is to store various setting, booting and other data for the device. However, dynamic and/or static random access memories are normally used for the storage of frequently changing data, such as variables needed for the running of a program, data to be displayed on a display, etc. In this specification, a memory cell refers to an element in the memory that is used for the storage of a single binary item of information.

The data memory used in electronic devices during their operation is typically a dynamic random access memory (DRAM) and/or a static random access memory (SRAM). In these memories, the storage content is not maintained when the operating voltage to the memory is disconnected. Writing in such random access memories is considerably faster than writing, for example, in said NAND Flash memory. Furthermore, the number of write operations per memory cell is several orders higher for a dynamic and static random access memory, until the memory cell loses its capacity to store information. However, a difference between the dynamic and the static random access memories is, for example, the way of implementing each memory cell. In the static random access memory, data is stored, for example, as the state of a switch formed by two or four FET transistors. The state of such a switch remains substantially unchanged until a new value is set for the switch or the operating voltage is disconnected. In the dynamic random access memory, data is stored, for example, in a capacitor coupled to the grid of a FET transistor, wherein the charge of the capacitor indicates whether the data stored in the memory cell is logical 0 or logical 1. Because the structure of the memory cell cannot be made completely lossless, the memory cell of the dynamic memory must be refreshed at intervals, that is, the charge stored in the capacitor is to be maintained in a set value. For this purpose, memory controllers are implemented to generate the necessary control signals. By means of these control signals, the data stored in the memory cells is read and rewritten in the memory cells. The frequency of repeating this refreshing operation is typically in the order of 1 to 20 ms.

FIG. 2 shows an example of the connection lines of a dynamic random access memory 4. Data is written and read via data lines D. Address lines Addr are used to transmit the address to the memory. The memory cells are arrayed in the form of a matrix, wherein the memory is indicated in two steps. A row address strobe line RAS is used to indicate when a row address is set in the address lines, and, correspondingly, a column address strobe line CAS is used to indicate when a column address is set in the address lines. A read/write line R/W is used to indicate whether data is to be read from or written in the memory. Furthermore, the memory advantageously has a chip enable line CE to activate the circuit.

It will be obvious that the above-presented connection lines of the NAND Flash memory and the dynamic random access memory are only a non-limiting example of implementing such memories.

The above-mentioned NAND Flash memory and dynamic random access memory are typically implemented as separate memory circuits in the electronic device, and the controllers needed for controlling the memory are implemented either by control circuits made for this purpose or, for example, by means of an application specific integrated circuit (ASIC). Thus, the ASIC circuit is provided with separate connection lines for the connection of both the NAND Flash memory and the dynamic random access memory. Data is transferred from the NAND Flash memory to the dynamic memory in such a way that, for example, the processor transmits a command, by which a given memory area is read, to the controller of the NAND Flash memory. Thus, the controller controls data transmission from the NAND Flash memory to the data bus of the NAND Flash memory, from which the data is transferred via the data bus of the dynamic random access memory to the memory cells of the dynamic random access memory. The control circuit generates the necessary address signals and other control signals. Data transmission in the other direction takes place in a corresponding manner. A problem in such an arrangement is, for example, that for the time of the whole data transmission, the data bus of the dynamic random access memory is busy for the data transmission, wherein the program code cannot be run. This problem can be reduced to some extent by reducing the number of bytes to be transmitted at a time, but the data transmission will thus be slower and require a larger quantity of the program code.

SUMMARY OF THE INVENTION

It is an aim of the present invention to provide a memory circuit, a system, and an electronic device, in which the data transmission between the non-volatile random access memory and the random access memory can be executed in a more efficient way than when using solutions of prior art. The invention is based on the idea that the non-volatile random access memory and the random access memory are connected by means of a controller which takes care of the data transmission between the memories. Furthermore, the random access memory is provided with a data bus for communication between the other parts of the device and the random access memory. To put it more precisely, the memory circuit according to the present invention is primarily characterized in that the memory circuit also comprises a memory controller which is connected by means of a first bus to the non-volatile random access memory, and by means of a second bus to the random access memory, wherein data can be transmitted between said non-volatile random access memory and random access memory via the memory controller, and which memory circuit comprises a control bus connected to the memory controller to control the operation of the memory circuit. The system according to the present invention is primarily characterized in that the memory circuit also comprises a memory controller which is connected by means of a first bus to the non-volatile random access memory, and by means of a second bus to the random access memory, wherein data can be transmitted between said non-volatile random access memory and random access memory via the memory controller, and which memory circuit comprises a control bus connected to the memory controller to control the operation of the memory circuit. The electronic device according to the present invention is primarily characterized in that the memory circuit also comprises a memory controller which is connected by means of a first bus to the non-volatile random access memory, and by means of a second bus to the random access memory, wherein data can be transmitted between said non-volatile random access memory and random access memory via the memory controller, and which memory circuit comprises a control bus connected to the memory controller to control the operation of the memory circuit.

The method according to the present invention is primarily characterized in that in the method, a memory controller is used in the memory circuit, which is connected by means of a first bus to the non-volatile random access memory and by means of a second bus to the random access memory, wherein data is transmitted between said non-volatile random access memory and random access memory via the memory controller, and the operation of the memory circuit is controlled by means of a control bus connected to the memory controller in the memory circuit.

The present invention shows remarkable advantages over solutions of prior art. When the memory circuit according to the invention is used, it is possible to use the random access memory, such as a dynamic random access memory, for example, in the running of the program code substantially simultaneously when data is being transferred between the non-volatile random access memory, such as a NAND Flash memory, and the random access memory within the memory circuit. This speeds up the operation of the electronic device, because unnecessary waiting is avoided in operations involving the memory. Furthermore, the arrangement according to an advantageous embodiment of the invention has the advantage that the memory connection of the non-volatile random access memory cannot be implemented separately in the electronic device, but the data transmission can be performed as an internal operation of the memory circuit. Thus, the data contained in the non-volatile random access memory can be read via the random access memory. In a corresponding manner, the writing in the non-volatile random access memory can be arranged via the random access memory.

DESCRIPTION OF THE DRAWINGS

In the following, the invention will be described in more detail with reference to the appended drawings, in which FIG. 3 shows a memory circuit according to an advantageous embodiment of the invention in a reduced block chart.

DETAILED DESCRIPTION OF THE INVENTION

Figure 2:
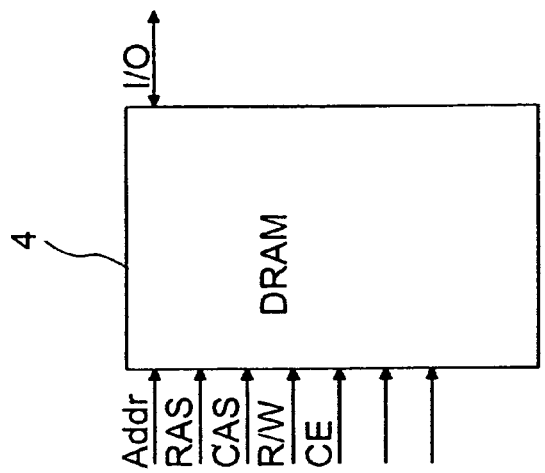
FIG. 2 shows the connection lines of a known dynamic random access memory of prior art in a reduced manner.
Figure 1:
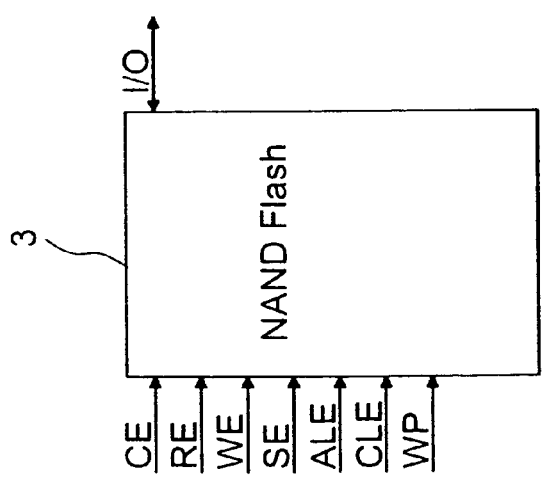
FIG. 1 shows the connection lines of a known NAND Flash memory of prior art in a reduced manner.

The following is a description of the memory circuit 1 according to a first advantageous embodiment of the invention and its operation in connection with an electronic device 2. FIG. 3 shows the structure of the memory circuit 1 in a reduced manner, and, correspondingly, FIG. 3 shows a system in which the memory circuit is used in connection with the electronic device 2. In this advantageous embodiment, the memory circuit 1 comprises a NAND Flash memory 3 and a dynamic random access memory 4. In this advantageous embodiment, the dynamic random access memory 4 is a so-called two-port memory, wherein the contents of the dynamic random access memory 4 can be processed via two ports (bus connections) 8, 11 in a way known as such. The NAND Flash memory 3 and the dynamic random access memory 4 are coupled to a memory controller 5 which is arranged to perform operations necessary for using the memories 3, 4. The NAND Flash memory 3 is connected to the first bus connection 7 of the memory controller 5 via a first bus 6. This first bus 6 preferably comprises the lines which are known as such, which are necessary for controlling the NAND Flash memory 3, and of which one example is shown in FIG. 1. In a corresponding manner, the first port 8 of the dynamic random access memory 4 is connected to the second bus connection 9 of the memory controller 5 by means of a second bus 10. The memory circuit 1 according to this first advantageous embodiment is connected to the other parts of the device by means of the first bus 6, a third bus 13 connected to the second port 11 of the dynamic random access memory 4, and a control bus 12. Via the first bus 6, data can be read from and written in the memory of the NAND Flash memory 3. Correspondingly, the third bus 13 can be used to read from and write in the dynamic random access memory 4. The control bus 12 is used for the control of the memory controller 5.

Furthermore, the electronic device 2 preferably comprises a processor 14 (a micro controller unit, MCU) which may be arranged e.g. in connection with an application specific integrated circuit (ASIC) 25, or it may be a separate processor. The electronic device also comprises a user interface 19 with, for example, a display 20, a keypad 21, and audio means 22a, 22b, 22c.

Figure 4:
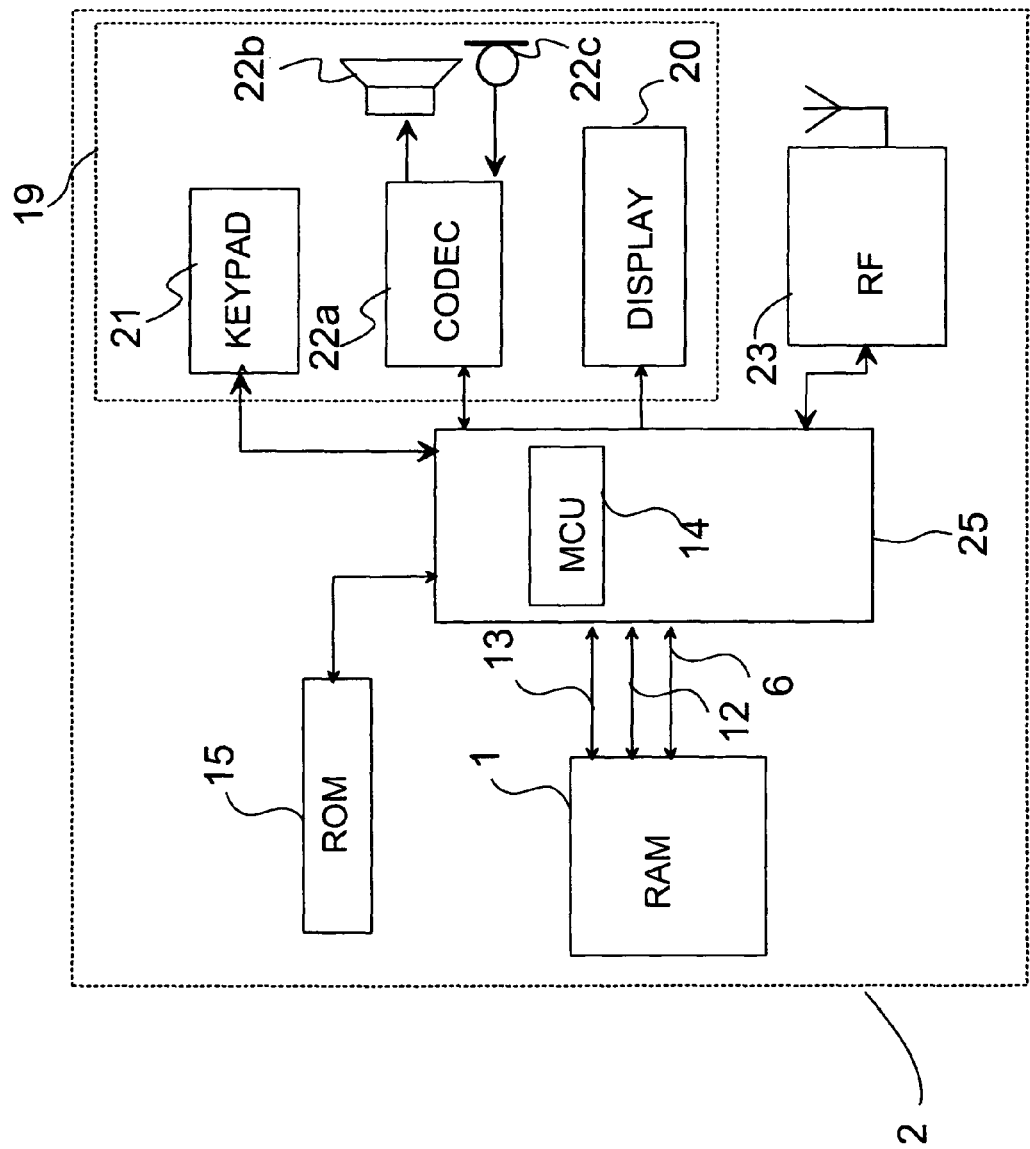
FIG. 4 shows a system and an electronic device according to an advantageous embodiment of the invention in a reduced block chart.
Figure 6:
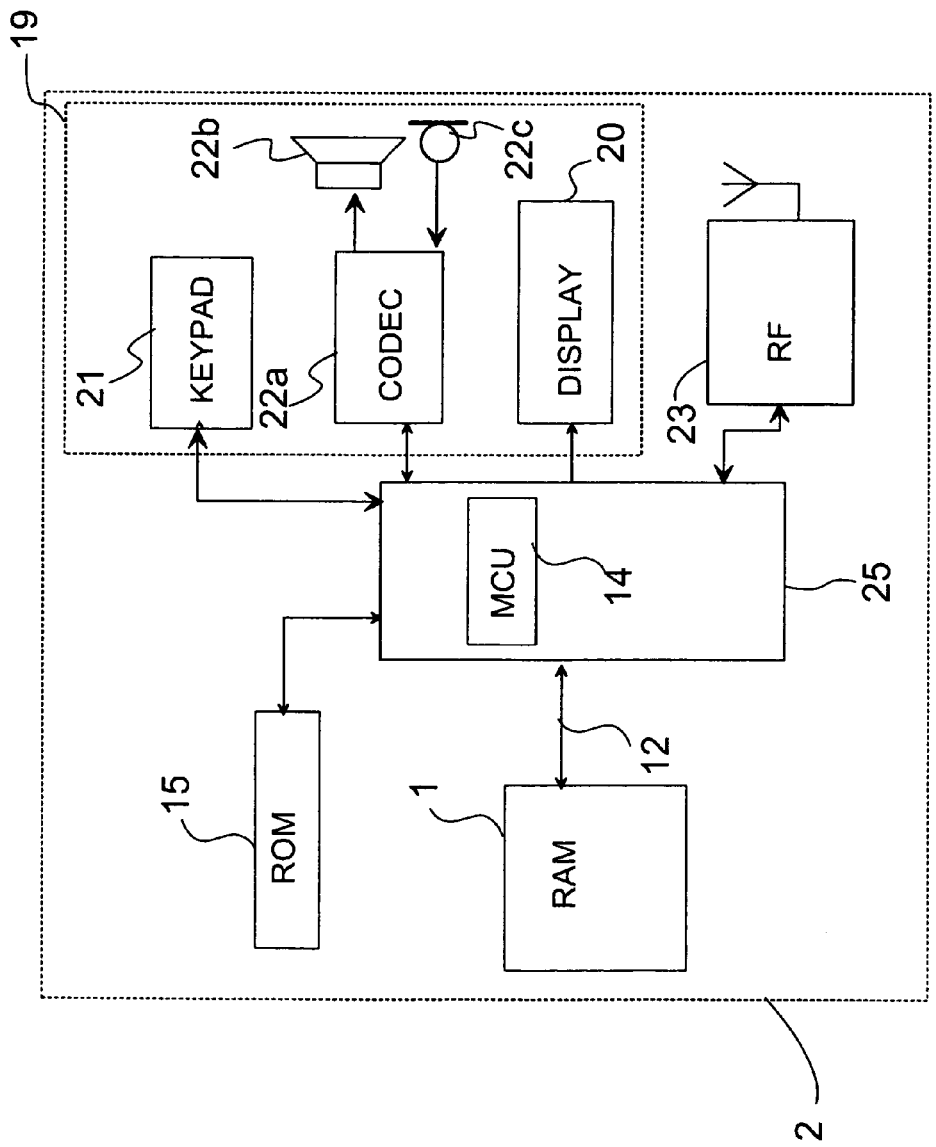
FIG. 6 shows a system and an electronic device according to another advantageous embodiment of the invention in a reduced block chart.

Furthermore, the electronic devices 2 shown in FIGS. 4 and 6 comprise communication means 23, such as means for performing mobile station functions. In addition to the NAND Flash memory 3 and the dynamic random access memory 4, the electronic device 2 comprises a read only memory (ROM) 24, for example, for the storage of the program codes of the processor. This read only memory used can also be a rewriteable non-volatile memory, such as an electrically erasable programmable ROM (EEPROM).

The memory circuit 1 according to the first advantageous embodiment of the invention can be used in the electronic device 2 preferably in the following way. Let us assume that the program code needed for starting the processor 14 of the electronic device 2 (FIG. 4) is stored in the read only memory 15, such as a ROM. Let us also assume that one or more programs which can be run in the electronic device 2 are stored in the NAND Flash memory 3, and that the running of such programs is arranged by the dynamic random access memory 4. When the operating voltages are coupled to the electronic device 2, the processor 14 starts to run a boot program with, for example, program steps for loading some programs from the NAND Flash memory 3 into the dynamic random access memory 4 for processing. The processor 14 sets the control lines of the control bus 12 of the memory controller 5 in a state in which the memory controller 5 starts data transmission from the NAND Flash memory 3 to the dynamic random access memory 4. Furthermore, the processor 14 sets information about the memory address of the program to be loaded, in the control bus 12. After this, the memory controller 5 sets the corresponding control signals in the first bus 6, to start the data transmission. The memory controller 5 reads information from the NAND Flash memory 3 preferably byte by byte, and transfers it to the dynamic random access memory 4 by setting, for each byte, the address data where the data is to be written, in the second bus. The memory controller 5 repeats the data transmission until one block (e.g. 32 bytes) has been transmitted to the dynamic random access memory 4. After this, the memory controller 5 uses the control bus 12 to inform the processor 14 that the data has been transmitted. In many cases, the quantity of data to be transmitted is larger than the quantity of data contained in one block, wherein the above-presented steps are repeated until all the necessary information has been transmitted. On the other hand, the data transmission can also be implemented in such a way that, at the beginning of the data transmission, the processor 14 also indicates the quantity of data to be transmitted. Thus, the memory controller 5 will be responsible for the transmission of the whole quantity of data, and the processor 14 can run another program code during the data transmission. During the above-presented data transmission, the processor 14 may process the dynamic random access memory 4 quite normally via the second port 11, for example for temporary storage of information.

The data transmission between the NAND Flash memory 3 and the dynamic random access memory 4 does not prevent other uses of the dynamic random access memory 4, wherein the processor 14 does not need to wait for the termination of the data transmission either. Naturally, it will be obvious that nevertheless, the processor 14 is normally not able to start to execute the program to the transmitted to the dynamic random access memory 4 until the whole program has been transmitted.

The above-presented data transmission operation can also be performed at other times than in connection with the start-up of the electronic device 2. However, the above-mentioned measures can thus be applied. In a corresponding manner, when information is transmitted from the dynamic random access memory 4 to the NAND Flash memory 3, the memory controller 5 takes the measures of setting the address where data is read from in the first port 8 of the dynamic random access memory, reading the data preferably one byte (8 bits), one word (16 bits) or a double word (32 bits) at a time, and transmitting the data to the first bus 6. For the NAND Flash memory 3, the base address, from which the data storage is started, is also set in the first bus. This base address is typically the base address of the memory block where the actual data to be changed is located. After this, the control data, by which the data storage in the NAND Flash memory 3 is started, is set in the first bus 6. After this, the NAND Flash memory 3 starts to store the data that was in the bus 6, in the location indicated by the base address. The memory controller 5 retrieves the data to be stored next from the dynamic random access memory 4 and transmits it to the first bus 6. The memory controller 5 examines the status of the ready/busy line RY/BY of the NAND Flash memory 3 in the first bus 6 to find out if the data has already been stored. After the preceding data has been stored, the NAND Flash memory 3 starts to store the next data, wherein the memory controller 5 reads the next data from the dynamic random access memory 4. The above-presented measures are repeated, until the required number of blocks has been stored. Consequently, when writing data in the NAND Flash memory 3, one should also note that the data is stored block by block. Thus, the memory controller 5 should take care that the data of the whole block is transmitted from the dynamic random access memory 4 via the first bus 6 to the NAND Flash memory 3, until the total number of blocks has been stored. Otherwise it might happen that incorrect information is stored in the NAND Flash memory 3.

The processor 14 may also process the contents of the dynamic random access memory 4 via the second port 11 during the above-mentioned write operations.

In this embodiment, the NAND Flash memory 3 can also be processed directly, without data transmission via the memory controller 5. In this case, e.g. the processor 14 generates the necessary control, address and data signals to the first bus 6.

Figure 5:
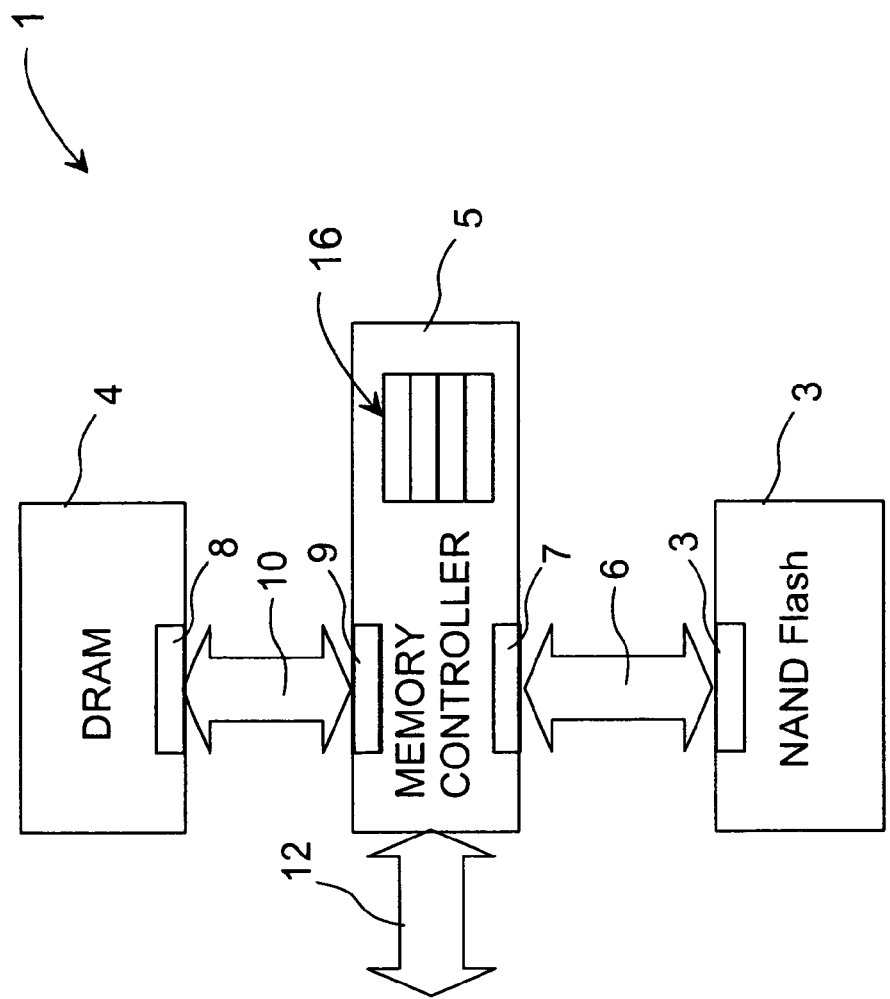
FIG. 5 shows the memory circuit according to another advantageous embodiment of the invention in a reduced block chart.

FIG. 5 shows a memory circuit according to another advantageous embodiment of the invention in a reduced block chart, and FIG. 6 shows an electronic device in which the memory circuit is used. Also in this advantageous embodiment, the memory circuit 1 comprises a NAND Flash memory 3, a dynamic random access memory 4 and a memory controller 5. In this advantageous embodiment, the dynamic random access memory 4 is not a two-port memory but a conventional dynamic random access memory. The NAND Flash memory 3 is connected to the first bus connection 7 of the memory controller 5 via a first bus 6. In a corresponding manner, the first port 8 of the dynamic random access memory 4 is connected to the second bus connection 9 of the memory controller 5 by means of a second bus 10. This memory circuit 1 according to the first advantageous embodiment of the invention is connected to the other elements of the device by means of a control bus 12. Yet another difference in this second advantageous embodiment is that with respect to the data lines, the bus width of the second bus 10 between the dynamic random access memory 4 and the memory controller 5 is double the number of data lines in the control bus 12. In other words, if the control bus 12 comprises for example 16 data lines, the second bus 10 comprises 32 data lines. Preferably, the number of data lines in the first bus 6 between the NAND Flash memory 3 and the memory controller 5 is the same, for example 8 bits, in both embodiments. It is obvious that the numerical values are only presented here to elucidate the invention, not to limit the scope of the invention.

The memory circuit 1 according to the second advantageous embodiment of the invention can be used in the electronic device 2 preferably in the following way. To execute data transmission between the NAND Flash memory 3 and the dynamic random access memory 4, the processor 14 sets a command in the control bus 12 whereby the memory controller 5 starts the required data transmission, and the required read and write address data. After this, the memory controller 5 starts the necessary operations for the data transmission. Because the number of data lines is not the same in the first bus 6 and in the second bus 10, the memory controller 5 may utilize this aspect in the data transmission. For example, the memory controller may read four bytes at a time from the dynamic random access memory 4 and store them in its own internal registers 16 to wait for the writing of data in the NAND Flash memory 3. The data can be preferably written one byte at a time in the NAND Flash memory 3. During the waiting time, it is possible to read data from or write data in the dynamic random access memory 4 via the control bus 12 preferably in the following way. The processor 14 sets the read or write address in the control bus 12 as well as a state in the read/write line 17 of the control bus or the like, to indicate whether the operation is reading or writing data. After this, the memory controller 5 reads data from the dynamic random access memory 4 or writes data in the dynamic random access memory 4 via the second bus 10. Because the number of data lines in the second bus 10 is preferably double the number of data lines in the control bus 12, the memory controller may reduce the loading of the dynamic random access memory 4 by reading/writing the data in, for example, groups of four bytes (double words) and transmit the data to/from the control bus in groups of two bytes (word by word).

For the processor 14, the connection of the memory circuit according to this second advantageous embodiment is substantially similar to the normal connection of a dynamic random access memory. Thus, the memory circuit 1 according to the second advantageous embodiment of the invention can be connected to replace an existing dynamic random access memory of the prior art. Thus, it will not be necessary to add program steps in the program code of the processor 14 for the processing of the NAND Flash memory, except for the control of the memory controller 5. Thus, the program code of the processor 14 does not need to include program steps to generate signals needed for the control of the NAND Flash memory 3. Also, a separate control circuit will not be needed in the electronic device 2 to control the memory circuit 1.

Advantageously, the memory controller 5 of the memory circuit 1 according to the present invention may also comprise the necessary means 18 for refreshing the dynamic random access memory 4. Thus, the electronic device 2 does not require separate means for refreshing the dynamic random access memory 4. However, the invention can also be applied in such a way that the processor 14 transmits, to the memory controller 5, signals which are required for the refreshing and which are transmitted by the memory controller 5 further to the dynamic random access memory 4.

The capacities of the NAND Flash memory 3 and the dynamic random access memory 4 in the memory circuit according to the present invention are not restricted as such, but the memory capacities may depend on the capacities of the non-volatile memory and the dynamic random access memory needed in each application. Furthermore, it should be noted that even though the memory circuit 1 according to the invention has been described above as a separate circuit, it will be obvious that in practical applications, the functional elements of the memory circuit according to the invention can be integrated in another circuit.

Even though the invention has been described above in a situation in which the non-volatile random access memory 3 is a NAND Flash memory and the random access memory 4 is a dynamic random access memory, it will be obvious that other kinds of memories can be used as well. For example, it is possible to use other Flash memories (NOR Flash, AND Flash, etc.) than the NAND Flash memory. Other non-restricting examples of non-volatile random access memories to be mentioned include EPROM (erasable programmable read only memory), EEPROM (electrically erasable programmable read only memory), and NROM™ (nitride read-only memory). Also, various mass storages, such as fixed disks, optical writeable disks, memory cards, and the like, can be applied as the non-volatile random access memory in the system according to the invention.

In a corresponding manner, the random access memory used does not necessarily need to be a dynamic random access memory, but also other types of random access memories can be applied in connection with the present invention. Some non-restricting examples to be mentioned include a static random access memory, a uni-transistor read only memory (UtRAM), etc.

It is obvious that the present invention is not limited solely to the above-presented embodiments but it can be modified within the scope of the appended claims.

The invention claimed is:

1. A memory circuit comprising at least a non-volatile random access memory, a random access memory, and a memory controller which is connected by a first bus to the non-volatile random access memory and by a second bus to the random access memory, wherein data can be transmitted between said non-volatile random access memory and random access memory via the memory controller, and which memory circuit further comprises a control bus connected to the memory controller, to control the operation of the memory circuit, wherein the random access memory comprises a two-port memory having a second port useable for running program code substantially simultaneously with the data being transmitted by a first port between said non-volatile random access memory and said random access memory.

2. The memory circuit according to claim 1, wherein said memory controller comprises means for generating control signals for writing in and reading from the non-volatile random access memory, as well as means for writing in and reading from the random access memory.

3. The memory circuit according to claim 1, wherein the first port of said random access memory is connected to said second bus, and that the second port of said random access memory is connected to a third bus of the memory circuit, to connect the random access memory to an external bus.

4. The memory circuit according to claim 1, wherein said non-volatile random access memory comprises or utilizes at least one of the following memory types:
Flash memory,
NAND Flash memory,
NOR Flash memory,
AND Flash memory,
EPROM,
EEPROM,
fixed disk,
optical disk.

5. The memory circuit according to claim 1, wherein said random access memory comprises at least one of the following memory types:
DRAM,
SRAM,
UtRAM.

6. A system with a memory circuit comprising at least a non-volatile random access memory, a random access memory, and a memory controller which is connected by a first bus to the non-volatile random access memory and by a second bus to the random access memory, wherein data can be transmitted between said non-volatile random access memory and random access memory via the memory controller, and which memory circuit further comprises a control bus connected to the memory controller, to control the operation of the memory circuit, wherein the random access memory comprises a two-port memory having a second port useable for running program code substantially simultaneously with the data being transmitted via a first port between said non-volatile random access memory and said random access memory.

7. The system according to claim 6, wherein said memory controller comprises means for generating control signals for writing in and reading from the non-volatile random access memory, and means for writing in and reading from the random access memory.

8. The system according to claim 6, wherein the first port of said random access memory is connected to said second bus, and that the second port of said random access memory is connected to a third bus of the memory circuit, to connect the random access memory to an external bus.

9. The system according to claim 6, wherein the memory circuit comprises a control bus for the transmission of commands and data between the memory controller and the system.

10. The system according to claim 6, wherein said non-volatile random access memory comprises or utilizes at least one of the following memory types:
Flash memory,
NAND Flash memory,
NOR Flash memory,
AND Flash memory,
EPROM,
EEPROM,
fixed disk,
optical disk.

11. The system according to claim 6, wherein said random access memory comprises at least one of the following memory types:
DRAM,
SRAM,
UtRAM.

12. An electronic device provided with a memory circuit comprising at least a non-volatile random access memory, a random access memory, and a memory controller which is connected by a first bus to the non-volatile random access memory and by a second bus to the random access memory, wherein data can be transmitted between said non-volatile random access memory and random access memory via the memory controller, and which memory circuit further comprises a control bus connected to the memory controller, to control the operation of the memory circuit, wherein the random access memory comprises a two-port memory having a second port useable for running program code substantially simultaneously with the data being transmitted via a first port between said non-volatile random access memory and said random access memory.

13. The electronic device according to claim 12, wherein it comprises a processor for controlling the functions of the electronic device.

14. The electronic device according to claim 13, wherein said control bus of the memory circuit is arranged to be used for the transmission of commands and data between the memory controller and the processor.

15. The electronic device according to claim 12, wherein said non-volatile random access memory comprises or utilizes at least one of the following memory types:
Flash memory,
NAND Flash memory,
NOR Flash memory,
AND Flash memory,
EPROM,
EEPROM,
fixed disk,
optical disk.

16. The electronic device according to claim 12, wherein said random access memory comprises at least one of the following memory types:
DRAM,
SRAM,
UtRAM.

17. The electronic device according to claim 12, wherein said random access memory comprises a dynamic random access memory, and that the memory controller comprises means for refreshing the dynamic random access memory.

18. A method in connection with a memory circuit, in which method at least a non-volatile random access memory, a random access memory, and a memory controller are used in connection with the memory circuit, which is connected by a first bus to the non-volatile random access memory and by a second bus to the random access memory, wherein data is transmitted between said non-volatile random access memory and random access memory via the memory controller, and the operation of the memory circuit is controlled by means of a control bus connected to the memory controller in the memory circuit, wherein the random access memory comprises a two-part memory having a second port useable for running program code substantially simultaneously with the data being transmitted via a first port between said non-volatile random access memory and said random access memory.

* * * * *